United States Patent [19]

Cazals et al.

[11] 4,324,172

[45] Apr. 13, 1982

[54] APPARATUS FOR TREATING WINE BY THE CHAMPAGNE METHOD

[75] Inventors: Claude O. E. Cazals, Marne; Jacques H. C. M. Ducoin, Mareuil-sur-Ay, both of France

[73] Assignee: Centre de Diffusion de la Methode Champenoise, Magenta, France

[21] Appl. No.: 149,672

[22] Filed: May 14, 1980

[30] Foreign Application Priority Data

May 16, 1979 [FR] France ............................... 79 12443
Jul. 12, 1979 [FR] France ............................... 79 18104

[51] Int. Cl.³ ............................................. C12H 1/22
[52] U.S. Cl. .................................. 99/277.1; 220/4 F; 220/19
[58] Field of Search .............. 99/275, 276, 277, 277.1, 99/277.2; 220/4 F, 19; 217/19; 426/7, 11

[56] References Cited

FOREIGN PATENT DOCUMENTS

| | | |
|---|---|---|
| 539550 | 1/1934 | Fed. Rep. of Germany ..... 99/277.1 |
| 483351 | 6/1917 | France . |
| 711840 | 9/1931 | France . |
| 1172368 | 2/1959 | France . |
| 2034398 | 12/1970 | France . |
| 2041582 | 1/1971 | France . |
| 2164093 | 7/1973 | France . |
| 2300807 | 9/1976 | France . |

Primary Examiner—Robert W. Jenkins
Attorney, Agent, or Firm—Robert Scobey

[57] ABSTRACT

Apparatus for treating wine in bottles according to the champagne method comprises a rack in the form of a rectangular parallelepiped open on one face which is opposite to a base provided with support elements for the necks of one layer of bottles which completely fill the said rack, sometimes with several other superposed layers of bottles, each layer supporting the next. The casing has two sets of feet or runners so that it can be placed in a first position where the bottles are horizontal or a second position where the bottles are vertical, neck down. The inwardly directed insides of the side walls of the rack are provided with rails set perpendicularly to the base so as to guide the introduction of the bottles in horizontal position through the open face of the rack and to assure the wedging of the bottles placed against the said lateral walls.

4 Claims, 18 Drawing Figures

Fig. 3

APPARATUS FOR TREATING WINE BY THE CHAMPAGNE METHOD

FIELD OF THE INVENTION

The present invention concerns an apparatus for treating wine in bottles according to the champagne method.

BACKGROUND OF THE INVENTION

French Pat. No. 69.13803 which the Applicants filed on Apr. 30, 1969 relates to an apparatus of this type which is characterised by a rack provided so that it can receive at least one layer of bottles disposed side by side parallel one to another, and comprising two sets of feet permitting it to be placed in two mutually perpendicular positions, in one of which the bottles are horizontal and in the other of which the said bottles are vertical, with their necks directed downwardly.

OBJECTS OF THE INVENTION

It is a first object of the present invention to provide an improved apparatus of the type according to the Patent noted, which in particular makes charging and discharging of the rack with the bottles to be treated easier.

It is a further object of the present invention to provide a rack of the type noted in which unloading of the rack by hand is rendered safer.

GENERAL DESCRIPTION OF THE INVENTION

The apparatus according to the present invention comprises a rack in the form of a rectangular parallelepiped, open on one face which is opposite to a base and provided with support elements for the corks of a layer of bottles which completely fills the rack, optionally with one or more other layers of bottles superposed thereon, some supported on others, the said rack comprising two sets of feet or runners permitting it to be placed in a first position in which the bottles are horizontal and a second position perpendicular to the first where the bottles are vertical with their necks directed downwardly; it is characterised in that the lateral walls of the rack, perpendicular to its base, are provided towards the interior of the rack with rails arranged perpendicularly to the base of the rack in such a fashion as to guide the introduction of the bottles in the horizontal position through the open face of the rack and to ensure the proper positioning of the bottles placed against the said side walls.

This arrangement according to the present invention facilitates not only the charging of the rack with the bottles to be treated but in addition it enables automatic i.e. mechanical charging to take place, for example, with the aid of a conveyor. In effect when the first layer of bottles is fed by the conveyor to the level of the lateral wall of the rack which is provided with feet (and which is horizontal in the charging position of the rack) from the side of the open face of the rack—that is to say opposite its base which is at that stage vertical—the conveyor deposits the first rank of bottles on to the free edge of the said lateral wall of the rack, then this first rank of bottles is pushed in the direction of the vertical base of the rack by the second rank of bottles then fed from the conveyor; during the course of their displacement towards the vertical base of the rack the lateral walls of the bottles of the first rank are then guided by the guidance rails which are disposed conveniently for this effect on the interior face of the lateral wall of the rack, which is at that stage horizontal. This process of charging the first lower layer of bottles takes place until the corks of the bottles of the first rank arrive in contact with the at that stage vertical base of the rack. The upper layers of bottles can then be charged successively in automatic fashion using each time a conveyor which feeds the bottles to the level of the upper face of the layer of bottles most recently charged into the rack. During charging of each layer of bottles, the "end" bottles of the layer, i.e. those which ought to be placed in contact with the two then vertical lateral walls of the rack are likewise guided by the rails which are provide on the interior face of these two vertical lateral walls. Of course, the other bottles of each of the upper layers are guided by the bottles of the immediately lower layer between which they come to engage.

In a preferred embodiment of the invention the guidance rails of the said lateral walls of the rack are constituted by rigid rods or wires which are fixed, particularly welded, on to the interior faces of the said lateral walls; in this case each of the said lateral walls can be formed essentially towards the interior of the rack by the rods or wires constituting the rails and towards the outside by rods or rigid wires or profiled sections which run transversely and which are welded to the rods or wires, while by their ends, welded to rigid sections, they form the edges of the wall. While permitting automatic charging of the bottles, this preferred embodiment of the rack according to the present invention is distinguished by relatively low weight allied to very substantial mechanical strength.

According to another characteristic of the invention the rack in the form of a rectangular parallelepiped has one of its lateral walls perpendicular to the base of the rack mounted in removable fashion, notably in a fashion to enable at least one part to be raised or folded back towards the base in order to facilitate the extraction of the bottles in the vertical position.

Thanks to this construction, when the rack is in the discharging position, and for this purpose its base is horizontal and supports the corks of the bottles which are kept vertical, the removable wall of the rack is itself vertical even if its lifting or its folding back which can just be partly towards the bottom permits lateral access to different layers of bottles. This considerably facilitates their extraction from the rack notably in the case of the lower layers of bottles since it is no longer necessary for this purpose to raise them manually up to the upper open face of the rack. Preferably the removable wall of the rack comprises two parts which are separately removable and each of which is preferably half the height of the removable wall.

SPECIFIC DESCRIPTION OF PREFERRED EMBODIMENTS

As an example there are described below exemplary embodiments of the rack according to the present invention with reference to the accompanying drawings in which.

Figure 1:
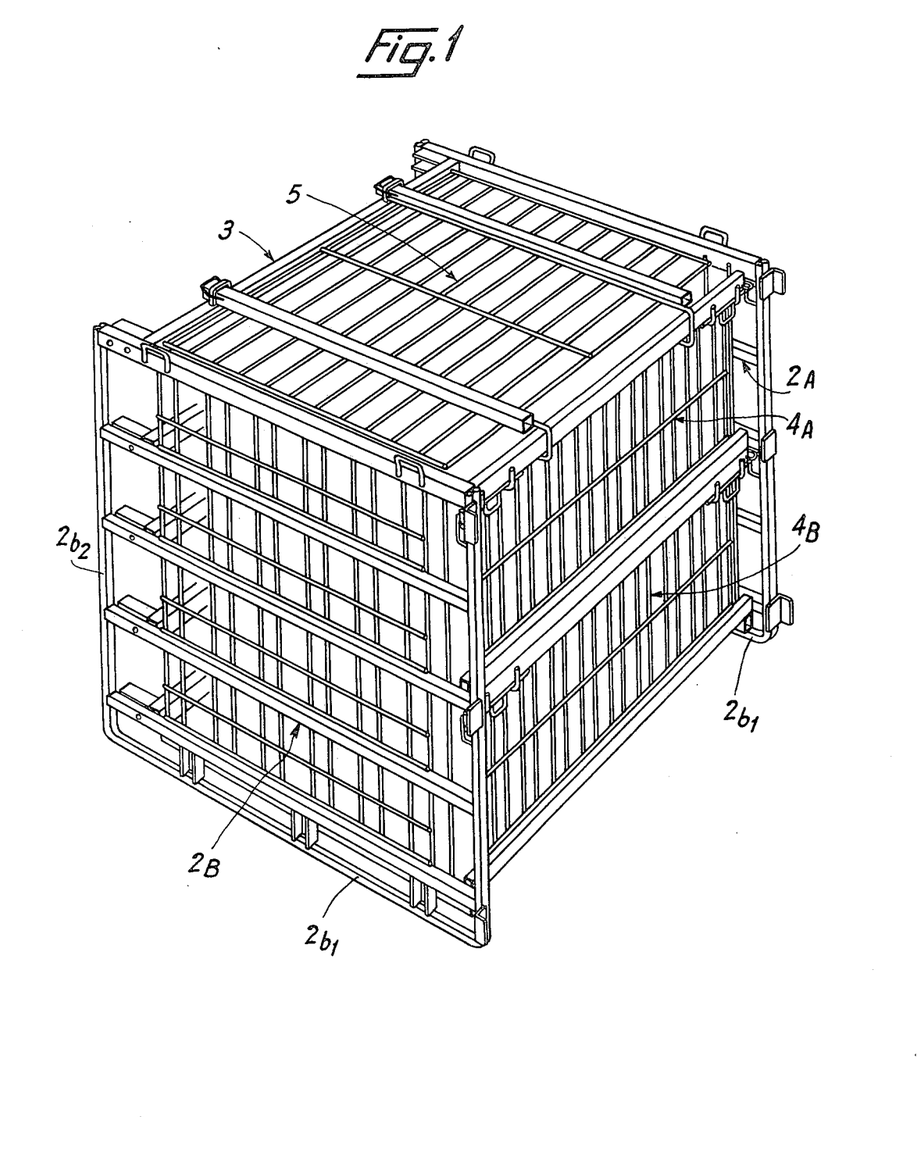
FIG. 1 is a perspective view of a rack according to the invention entirely closed and resting on the ground by the feet or runners which are provided at its base.
Figure 2:
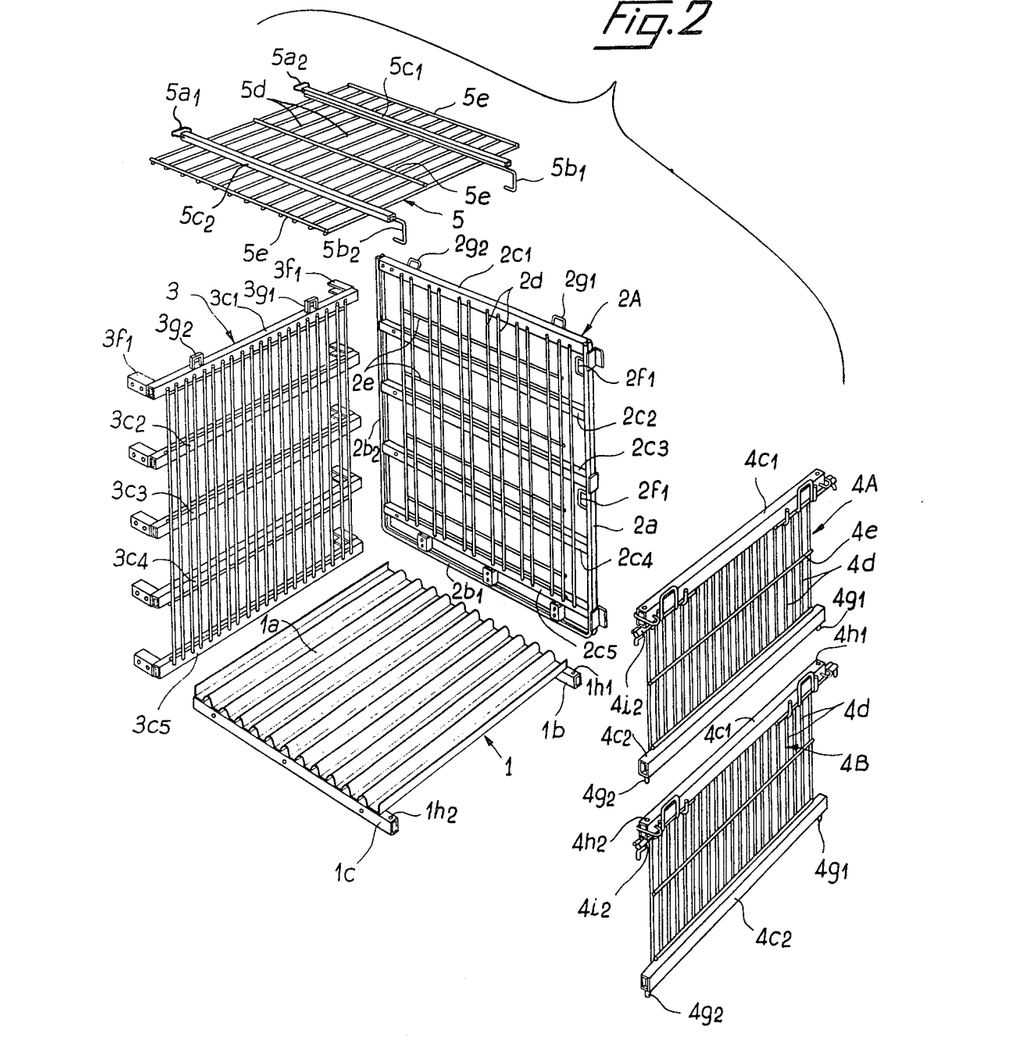
FIG. 2 is an exploded view of the rack of FIG. 1.
Figure 3:
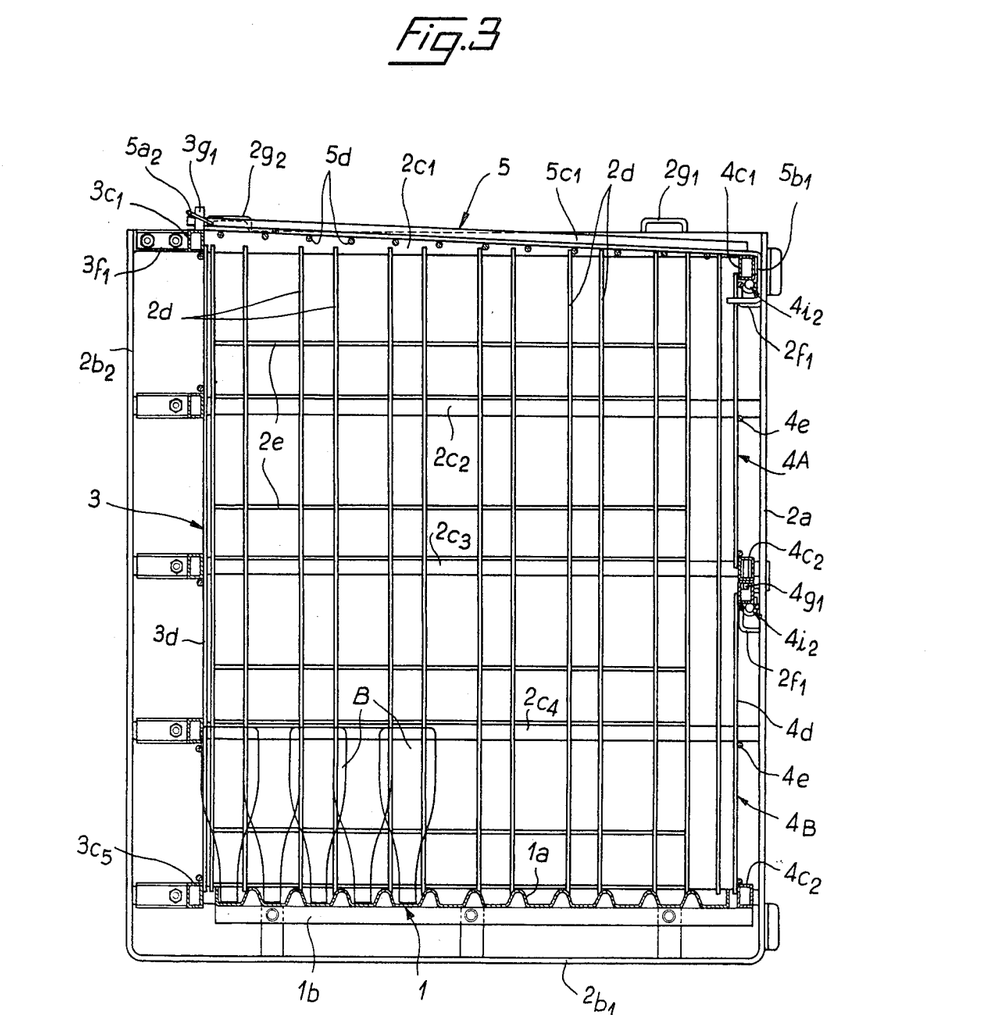
FIG. 3 is a view of the rack of FIG. 1 in section through a vertical plane perpendicular to its removable lateral wall.

As visible in FIGS. 1 to 3 the rack according to the present invention is in the form of a rectangular parallelepiped and it comprises the following six walls: its base 1 is constituted essentially by a sheet $1a$ having regular parallel grooves towards the interior of the rack. It is fixed towards the exterior of the rack to two metal rigid bars $1b$ and $1c$ which are pierced by appropriate fixing holes. Two fixed lateral walls 2A and 2B of the rack comprise on three sides a tubular framework $2a$ forming at its lower part a first foot or runner $2b_1$ laterally, a second foot or runner $2b_2$ while rigid bars $2c_1$ forming the upper edge of the wall and $2c_2$ to $2c_5$ form cross members. On the faces of the bars $2c_1$ to $2c_5$ directed towards the interior of the rack there are welded rigid wires generally metallic such as $2d$ disposed perpendicular to the base 1 of the rack. On these vertical wires $2d$ other metallic wires $2e$ are horizontally welded on the side turned towards the exterior of the rack. Wires $2d$ and $2e$ thus form rigid grids but the parts of the vertical wires $2d$ which are directed towards the interior of the rack do not project at all between the bars $2c_1$ and $2c_5$ to which they are welded at the respective ends of these wires $2d$. A third fixed wall 3 of the rack is likewise essentially constituted by rigid horizontal bars $3c_1$ to $3c_5$ connected by vertical metallic rods $3d$ which are welded to the faces of the rigid bars which are directed towards the interior of the rack. Brackets such as $3f_1$ are welded on to the outside of the wall to each of the ends of each horizontal bar such as $3c_1$. The different walls 1, 2A, 2B and 3 of the rack are assembled one with another preferably by nuts and bolts which pass through appropriate apertures in certain of their bars (for example bars $1b$ and $1c$ of the base 1 are screwed to the lower bars $2c_5$ of the lateral walls 2A and 2B).

The face of the rack opposite its fixed lateral wall 3 can be closed by a removable lateral wall in two parts 4A and 4B. Each of the two parts 4A and 4B is constituted essentially by two horizontal bars $4c_1$ and $4c_2$ the faces of which directed towards the interior of the rack are connected together by rigid vertical bars $4d$ having their ends welded to the said faces of the bars. The rigid wires $4d$ of each part 4A or 4B are strengthened by a transverse wire $4e$ which is welded towards the middle of the vertical wires $4d$ to the side directed towards the exterior of the rack. The bar $4c_2$ constituting the lower edge of each of the two parts 4A and 4B of the removable wall comprises at least two pins $4g_1$, $4g_2$ which can be engaged in corresponding holes $1h_1$ and $1h_2$ of the base 1 of the rack for the part 4B or for part 4A and corresponding holes $4h_1$ and $4h_2$ of the upper edge $4c_1$ of the immediately lower part 4B. In addition the upper edge $4c_1$ of each of the parts 4A and 4B of the removable wall is provided at its ends with hook latches $4i_1$ and $4i_2$ fitted in such a fashion as to cooperate with the edges of corresponding openings in the two neighbouring lateral walls 2A and 2B respectively. In the embodiment under consideration these edges of the openings of the lateral walls 2A and 2B with which they are come to cooperate the hooks respectively of latches $4a_1$ and $4i_2$ are formed by the loops of rigid wire $2f_1$, $2f_2$ welded to the vertical corresponding edges $2a$ of the walls 2A and 2B.

On the other hand in the embodiment in question of the rack according to the present invention its upper opening, opposite to base 1, can be likewise closed by a removable wall 5, formed for example from a trellis of rigid metal wires $5d$ and $5e$ perpendicular to one another and welded to one another at their crossing points as well as to two very rigid metal bars $5c_1$ and $5c_2$ which form reinforcements. This removable wall 5 can be fixed for example to the upper edges $3c_1$ of the wall 3 and $4c_1$ of the upper half-wall 4A; in the embodiment under consideration privoting loops $5a_1$ and $5a_2$ are mounted on the corresponding ends of the bars $5c_1$ and $5c_2$ in such a fashion that they may respectively be engaged over eyes $3g_1$ and $3g_2$ themselves welded to the bar $3c_1$ of wall 3 while the other ends of bars $5c_1$ and $5c_2$ carry hooks $5b_1$ and $5b_2$ which are curved downwardly in such fashion that they come to engage below the bar $4c_1$ of half-wall 4A.

There will now be described with the aid of FIGS. 4 to 8 the way in which the rack illustrated in FIGS. 1 to 3 is used for treating wine in bottles according to the champagne method.

Figures 4, 5, 6, 7:
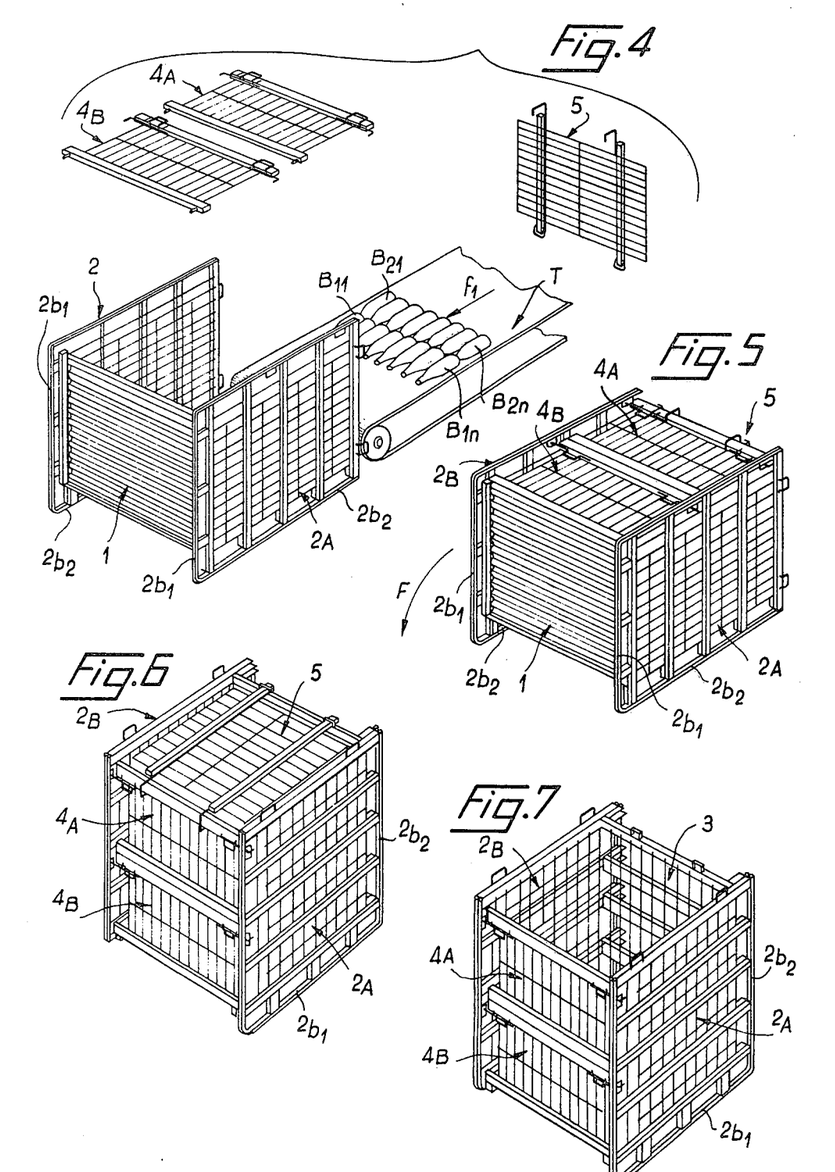
FIGS. 4 to 8 illustrates successive phases of treatment by the champagne method of the bottles of wine introduced into the rack of FIG. 1 in such a fashion as to fill it completely.
Figures 8, 9:
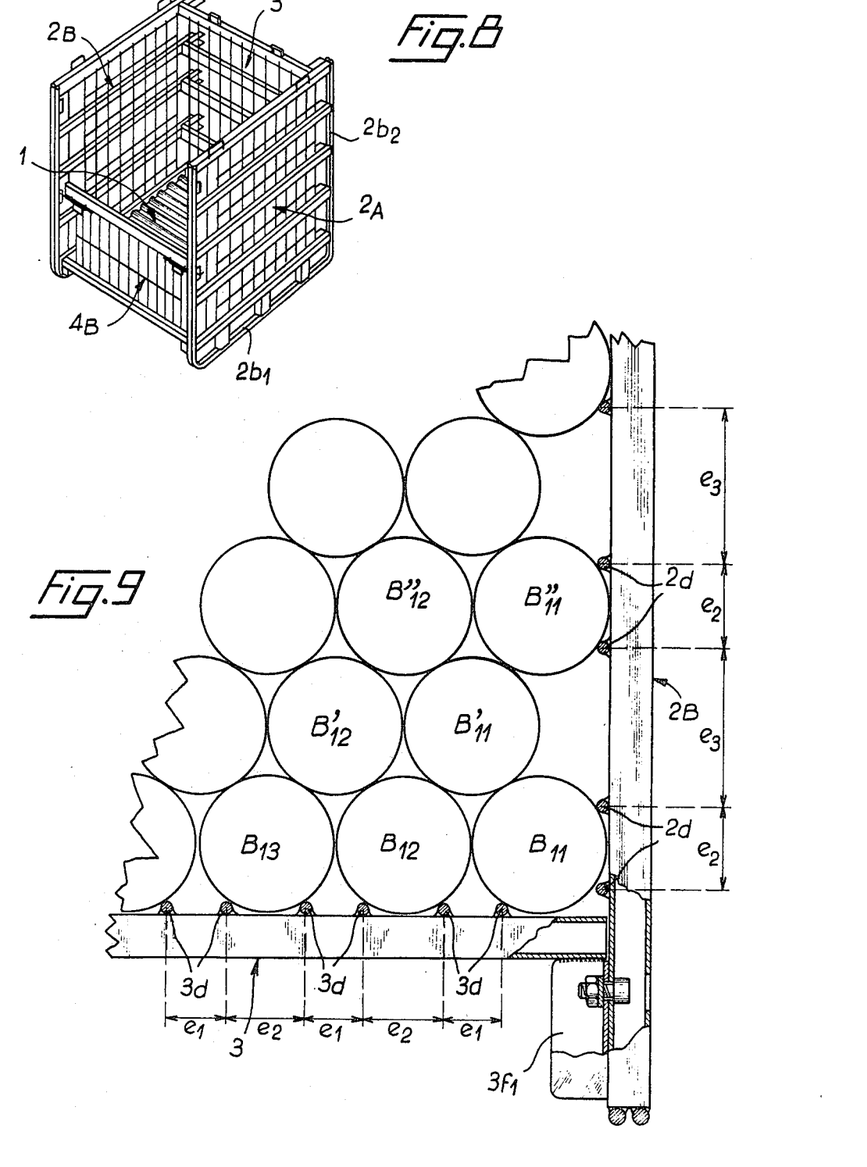
FIG. 9 is schematic illustrating the guidance of the bottles during the introduction into the rack of FIG. 1.

The removable walls 4A, 4B and 5 of the rack having been separated from the latter, the said rack is placed on the ground by its second feet or runners $2b_2$ in such a fashion that its base 1 is vertical as shown in FIG. 4. A conveyor T, for example a belt, is disposed in such a fashion as to feed bottles to the upper face which is directed towards the interior of the rack of its wall 3 which is at this stage horizontal. On the transport belt T the bottles containing the wine to be treated which are destined to form a lower layer of bottles on the horizontal wall 3 of the rack are disposed relative to one another preferably in relative positions identical to those which they should take up in the rack. In other words the end bottles $B_{11}$ to $B_{1n}$ of the first rank (in the sense of feeding of conveyor T indicated by the arrow f) are disposed one against another with their necks directed towards the rack. The n bottles of the second rank $B_{21}$ to $B_{2n}$ are disposed in the same fashion one against another with their corks engaged respectively in the cavities in the bases of the bottles of the preceding rank of $B_{11}$ to $B_{1n}$ and it is the same for the following ranks of bottles which are not shown. When the transporter T has deposited the first rank of bottles $B_{11}$ to $B_{1n}$ on the edge $3c_1$ of the horizontal wall 3, the said first rank of bottles comes to engage exactly against the two vertical walls 2A and 2B of the rack and when this first rank of bottles is pushed on to the wall 3 of the rack by the bottles of the second rank $B_{21}$ to $B_{2n}$, again carried by the conveyor T, the bottles of the said first rank are guided in their movement and direction of the base 1 of the rack by the continuous rigid wires $3d$ which do not present any projection opposed to the progression of the said bottles $B_{11}$ and $B_{1n}$ from the edge $3c_1$ of the horizontal wall 3 up to its base $3c_5$ which is situated at the level of the vertical base 1. FIG. 9 shows how the bottles of the first rank $B_{11}$, $B_{12}$ . . . of the lower layer are guided in their progress towards the base 1 of the rack by the rigid wires $3d$ which are welded to the upper face of the horizontal wall 3 with spacings $e_1$, $e_2$ adapted to the respective diameters of the bottles and of the wires $3d$. One can likewise see the guidance of the lateral wall on the end bottle $B_{11}$ of the said first rank by two of the rigid wires $2d$ which are fixed with a spacing $e_2$ on the internal face of wall 2B. The rigid wires noted, $3d$ and $2d$, form a sort of rail set which is disposed perpendicular to the base 1 of the rack in such a fashion as to guide the introduction of the bottles in horizontal position. The same wires $3d$, $2d$ then ensure the wedging of the bottles $B_{11}$, $B_{12}$ . . . when their corks have at last come into contact with the grooved sheet $1a$ of the base 1; the lower part of FIG. 3 shows clearly that the corks of the different bottles of the first rank $B_{11}$, $B_{12}$ . . . are then respectively engaged between the grooves of the plate $1a$. When the feeder T has thus charged the lower layer of bottles on the horizontal wall 3 of the rack the relative position of these two elements is changed in height, either by displacement of the rack or by displacement of the conveyor, in such a fashion that the said conveyor can charge a second layer of bottles above the first. One can see from FIG. 9 that the second layer of bottles $B'_{11}$, $B'_{12}$ . . . is disposed staggered relative to those in the first layer $B_{11}$, $B_{12}$, this because during the course of feeding the bottles of the second layer are guided in their progress towards the vertical base 1 of the rack by the intervals between the lateral walls of the contiguous bottles of the lower layer. The upper part of FIG. 9 shows in addition that, at least for one layer in two, each end bottle of a rack of the layer which comes into contact with a lateral wall such as 2B is guided in its progress by the rigid wires $2d$ spaced at $e_2$ which assures in addition the wedging of the extreme bottles when they are fed into position of rest in the rack (the spacing $e_3$ being a little greater than the diameter of a bottle).

When the rack is entirely charged with bottles to be treated the half-walls 4B and then 4A are placed on and these are locked in place with the aid of their latches $4i_1$ and $4i_2$. The wall 5 is then fixed engaging first its hooks $5b_1$ and $5b_2$ over the edge $4c_1$ of the half-wall 4A and then folding down the pivoting loops $5a_1$ and $5a_2$ on to the eyes $3g_1$ and $3g_2$ of the edge $3c_1$ of the wall 3. The rack thus closed on all sides is shown in FIG. 5.

With the aid of a lifting device, the hooks of which are engaged for example in loops such as $2g_1$ welded to edges $2c_1$ of lateral walls 2A and 2B, the assembly of the rack and its charge are made to pivot in the direction of arrow F (see FIG. 5) in such fashion as to lead it into its position schematically illustrated in FIG. 6 where it rests on the ground no longer by means of its runners $2b_2$ but by means of runners $2b_1$. In this new position of the rack all the bottles which are contained are then found in a vertical position with their corks directed downwardly and supported in each case in the cavity of the base of the bottle immediately below or in the interval between two grooves of the grooved plate $1a$ of the base 1 for the bottles which are nearest it.

Now for proceeding to discharge the rack mechanically, the removable wall 5 is first disengaged and removed from the opening opposite base 1, which is now turned upwardly, as shown in FIG. 7. This then permits mechanical extraction from the rack of the bottles of the upper layer, for example by seizing them by their respective bases, which are turned towards the top, with the aid of suckers. One can also proceed to discharge the upper layer of bottles manually. For this it is preferably necessary to dismount in addition the upper removable half-wall 4A as illustrated in FIG. 8, and then, when about half the upper layers of bottles have been discharged, to remove the lower half-wall 4B, in order to proceed with the manual discharge of the lower layers of bottles.

Of course the pivoting of the rack in the sense of arrow F (FIG. 5) which causes the bottles to be treated, enclosed in the rack, to pass from their horizontal position to their vertical position, the neck being directed downwardly, can also be carried out using a support such as that described in French Pat. No. 69.13803 and illustrated on its FIGS. 4 to 7.

Each of the two latches $4i_1$ and $4i_2$ which are provided on each of the two removable half-walls 4A and 4B can be constructed for example as illustrated on FIGS. 10 to 15. The hook latch $4i_1$ illustrated in these Figures is constituted essentially by a metal rod 7 to the central part of which is fixed, particularly be welding, an actuation handle 8 and which is mounted in free sliding fashion in two eyes $9a$, $9b$ which are themselves welded to one of the ends of bar $4c_1$ of the half-wall 4A (or 4B). On the end of the rod 7 of the latch which slightly projects past the corresponding end of bar $4c_1$ are welded on the one hand a hook $7a$ opposite to grip 8 relative to the rod 7 and on the other hand a cam $7b$ which can be constituted for example by an element of cylindrical rod. In the interior of the hollow bar $4c_1$ on the other hand there is mounted a locking bar 10 of which one end emerges from the said bar $4c_1$ and which is welded to a prong $10a$ for freeing the locking action as explained below. On the inside of the hollow bar $4c_1$ the bar 10 of bolt is normally engaged by a leaf spring 11 which pushes the end of bar 10 against the interior wall of the said bar $4c_1$—which notably can be of a transverse rectangular section—which is nearest the rod 7 of the latch. The hook latch, provided with its sprung locking bar, which has just been described, functions in the following fashion, illustrated in FIGS. 10 to 15.

Figure 10:
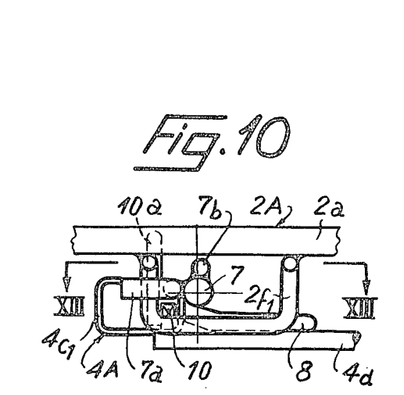
FIGS. 10 to 12 are views of the end of one of the latches of the removable wall sections which are provided on the rack of FIG. 1, in three different positions of the latch.
Figure 11:
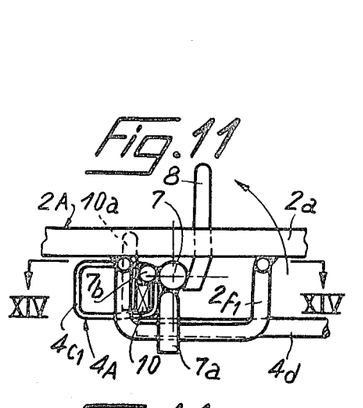
Figure 12:
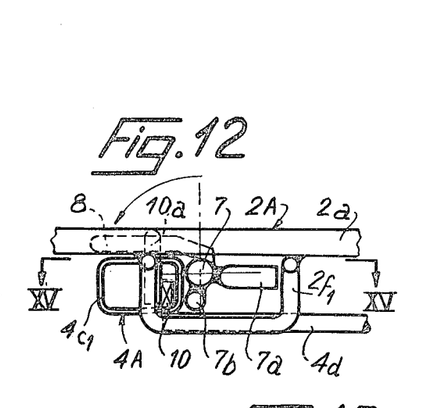
Figure 13:
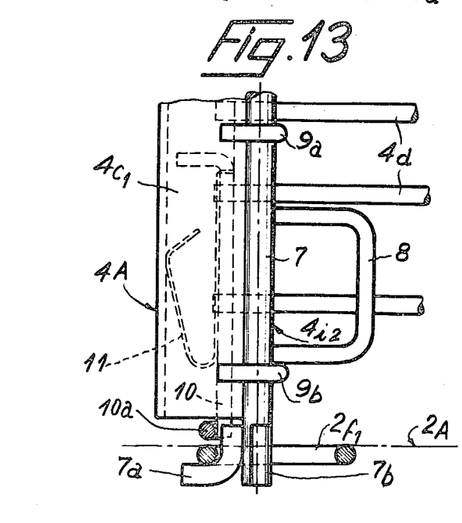
FIGS. 13 to 15 are plan views corresponding respectively to FIGS. 10 to 12.
Figure 14:
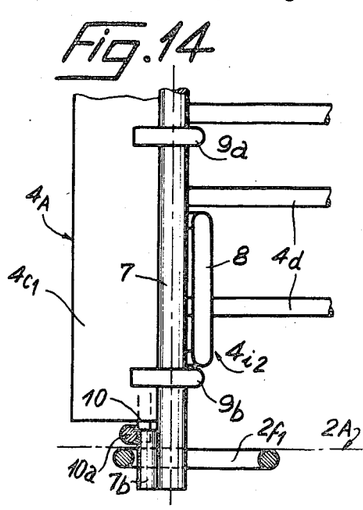
Figure 15:
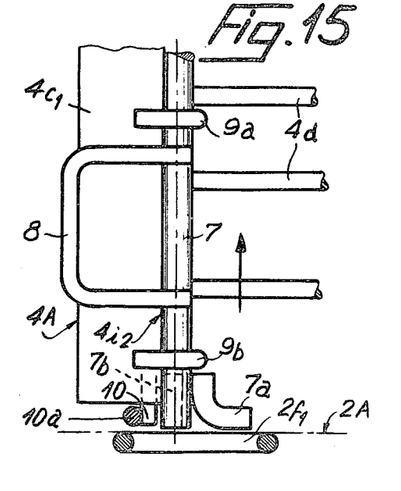

In the bolted position illustrated in FIGS. 10 and 13, the grip 8 of the latch is set against wires $4d$ of the half-wall 4A. The rod 7 of the latch projects maximally past the lower end (see FIG. 13) of the bar $4c_1$ in such a fashion that its hook $7a$ is engaged in the opening formed by the bow $2f_1$ of the corresponding side wall 2B and cooperates with the said bow $2f_1$ in fashion such as to affix to wall 2B the removable half-wall 4A. The latch $7$-$7a$ is kept in this locked position by the end of bar 10 of the bolt which opposes any rotation of the hook $7a$ counter-clockwise as seen in FIG. 10, which one can try and produce by making the rod 7 pivot in the same sense by means of its grip 8. In order that this latter movement of unlocking should become possible it is necessary to exercise manually on element $10a$ action tending to draw aside the end of bar 10 away from the internal wall of the hollow part $4c_1$, overcoming the elastic action of the leaf spring 11. It then becomes possible to lead the grip 8 of the latch initially into the position perpendicular to wires $4d$ of the half-wall 4A, which is illustrated in FIGS. 11 and 14, and then to fold back the said grip 8 to position over the bar $4c_1$ of the half-wall 4A, as illustrated in FIGS. 12 and 15. When one then relates the prong 10a, the end of bar 10 is no longer in a position to act against the hook 7a welded to the rod 7 of the latch nor on the cam 7b which is likewise welded thereto. It thus becomes possible to make the said rod 7 slide in eyes 9a,9b in the direction shown on FIG. 15 in such a fashion that the hook 7a come out of bow $2f_1$ of the wall 2B. When the latch $4i_2$ located at the other end of bar $4c_1$ of the half-wall 4A has been freed by an identical manoeuvre, it becomes possible to lift the half-wall 4A from the rack by exercising on it a pulling force permitting pins $4g_1$ and $4g_2$ which are fixed to bar $4c_2$ to come out of holes $4h_1$ and $4h_2$ of $4c_1$ of the half-wall 4B. After replacing each removable half-wall such as 4A, its locking takes place in the following fashion: acting on the grip 8, one first makes the rod 7 of the latch $4i_1$ run in the sense opposite to the arrow indicated on FIG. 15, in such a fashion as to reintroduce the hook 7a into the bow $2f_1$ of the side wall 2B. The rod 7 of the latch 7 is then made to pivot with the aid of the grip 8 in the sense opposite to that of the arrows indicated on FIGS. 12 and 11, in such a fashion as to fold down the said grip 8 into contact with wires 4d of the half-wall 4A. In the course of these latter movements of the grip 8, the cam 7b which is welded to the end of the rod 7 of the latch pushes away the end of the bar 10 overcoming the force of the leaf spring 11 in order to permit the rotation of the rod 7 between the positions illustrated respectively on FIGS. 12 and 11. Then it is the part of hook 7a welded to the end of rod 7 which pushes away the end of bar 10 of the bolt overwhelming the force of leaf spring 11 in order to allow the said hook 7a to reach the locking position shown on FIGS. 10 and 13. In the intermediate position of the latch $4i_2$ which is illustrated in FIGS. 11 and 14 its hook 7a remains engaged in the bow $2f_1$ but the cam 7b is out of the way while in the locking position (FIG. 10) it forbids all movement of the removable half-wall 4A in the direction of bar 2a of the neighbouring lateral wall 2A that is to say towards the exterior of the rack. As a result, before discharging the rack through its upper opening, in particular with the aid of suckers, it is necessary to put all of the latches $4i_1$, $4i_2$ into their intermediate position (FIGS. 11 and 14) and to push the half-walls 4A, 4B slightly towards the exterior of the rack, in such a fashion as to loosen the bottles to be discharged. Of course the movements of the half-walls 4A, 4B towards the exterior are stopped by the cooperation of the rod 7 of the latches with the elements 2a of the neighbouring lateral walls such as 2A.

After treatment, the rack thus filled with bottles can be emptied manually first through its upper open face and then preferably through a removable lateral wall of the rack. However, the raising or opening, even partial, of this lateral wall is not without creating a risk of tipping out from the rack at least bottles of the upper layers which are nearest the said lateral removable wall. Furthermore each time a rank of bottles is removed manually, the next rank of bottles can find itself put out of balance and certain at least of the bottles of this neighbouring rank can fall down and indeed break.

According to another characteristic of the invention flat grilles the adjacent apertures of which are adapted to the necks of the bottles are fixed in a movable fashion to the lateral walls of the rack parallel to its base at heights appropriately above the said base in order that each grille supports the necks of the bottles of the same layer, placed vertically with their necks turned towards the bottom.

Thanks to this arrangement each bottle of one layer is supported in the rack by the corresponding grille in an opening of which its neck is engaged. Because of the fact manual extraction of a bottle from the rack can no longer have the effect of unbalancing neighbouring bottles in the same layer, since these continue to be supported by the corresponding grille.

In a preferred embodiment of the invention one of the lateral walls of the parallelepiped rack is mounted in removable fashion in order to facilitate the extraction of the bottles in vertical position and each grille is divided into at least two independent elements along a plane parallel to the said lateral removable wall of the rack.

This particular embodiment facilitates advantageously again the manual discharge of the rack which then takes place in the following fashion: the lateral removable wall of the rack is first raised or opened, at least partially, which has as its effect allowing access to the superposed ranks of bottles nearest the said lateral wall. This renders manual removal easy at once of the uppermost half-layer of bottles supported by the upper half-grill, then of the upper half-grill and then of the half-layer of bottles immediately below and of the half-grill correspondingly and continuing in this fashion until the extraction of all bottles which were supported by the superposed half-grilles nearest the removable wall of the rack has terminated. Likewise then easily carried out is the manual removal of the superposed half-layers of bottles which are still in the rack and against its lateral wall opposite the removable wall, the corresponding half-grilles being likewise removed as this second phase of discharging the rack takes place.

Figure 16:
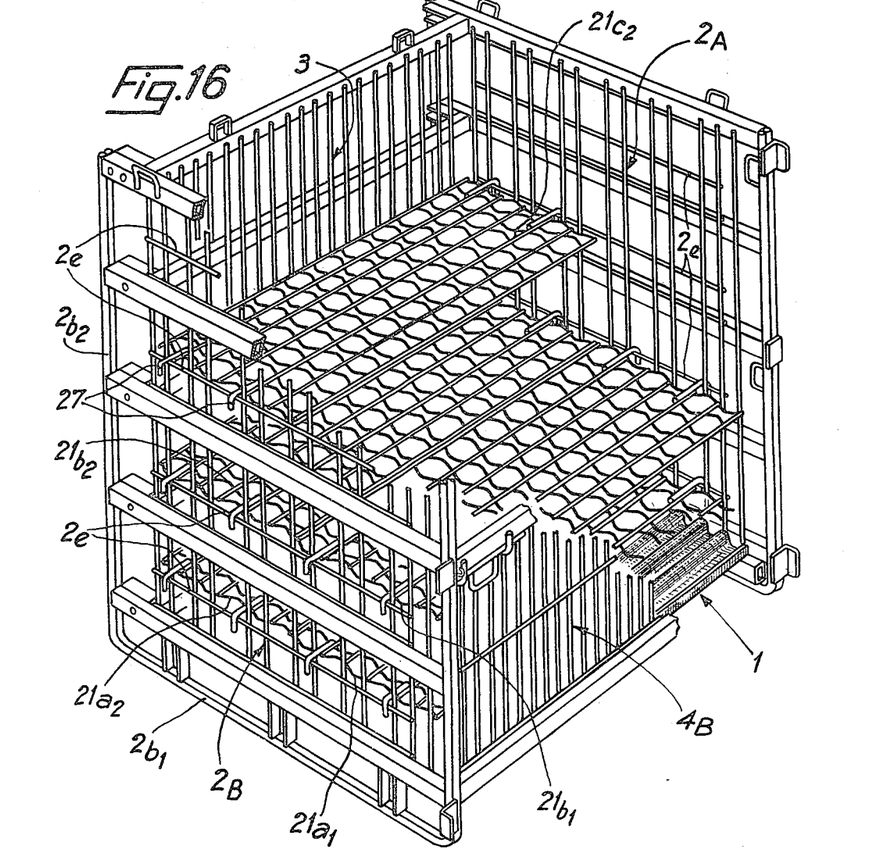
FIG. 16 is a perspective view partially cut away of a rack according to the present invention provided with certain flat grille.

As shown in FIG. 16, the rack is in the form of a rectangular parallelepiped and comprises the following six walls: its base 1 is constituted essentially by a sheet having parallel grooves 1a regularly spaced and directed towards the interior of the rack; two lateral fixed walls 2A and 2B each bearing at its lower part a first runner $2b_1$ and laterally a second runner $2b_2$; between these two side walls 2A and 2B there extends a third fixed side wall 3; the face of the rack opposite to this fixed side wall 3 can be formed by a removable side wall in two parts of which the lower part 4B is shown partially in FIG. 16, its upper part 4A being supposed to have been removed. As described in French patent specification No. 69.12803 the four side walls 2A, 2B, 3 and 4A, to 4B of the rack are formed essentially in this particular embodiment by rods or metal wires which are rigid which are disposed transversely relative to one another and welded at their crossing points.

Figure 17:
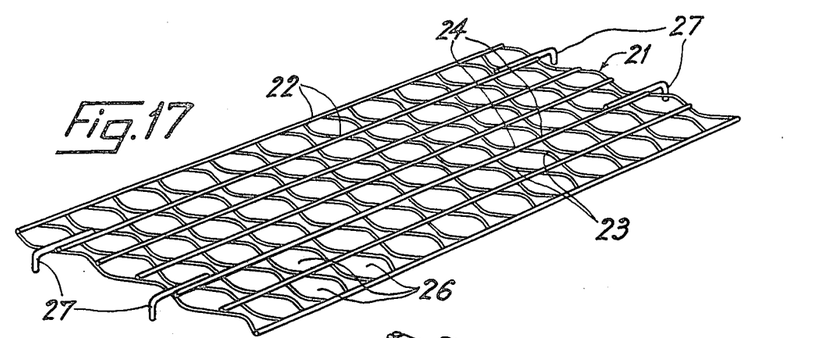
FIG. 17 is a perspective view of one of the grille elements with which the rack of FIG. 16 is furnished.

FIG. 17 shows in perspective a grille element 21 which in this embodiment is likewise formed by rigid metal rods 22 disposed parallel to one another and having a regular spacing as well as by rigid metal wires 23 disposed transversely to the rods 22 and welded to these at their crossing points such as 24. The metal wires 24 are themselves wavy in such a fashion as to define with metal rods 22 juxtaposed openings 26 forming a regular two-dimensional array and each having a form adapted to the transverse section of the neck of each of the bottles of wine to be treated by the champagne method. The grille element 21 thus formed has a substantially elongate rectangular shape and its two small sides provided with open hooks 27, for example welded to certain of the rods 22. These hooks 27 are disposed in such a manner as to be able to cooperate with certain of the horizontal metal wires 2e which form part of the fixed lateral walls 2A and 2B of the rack, as shown in FIG. 16.

Figure 18:
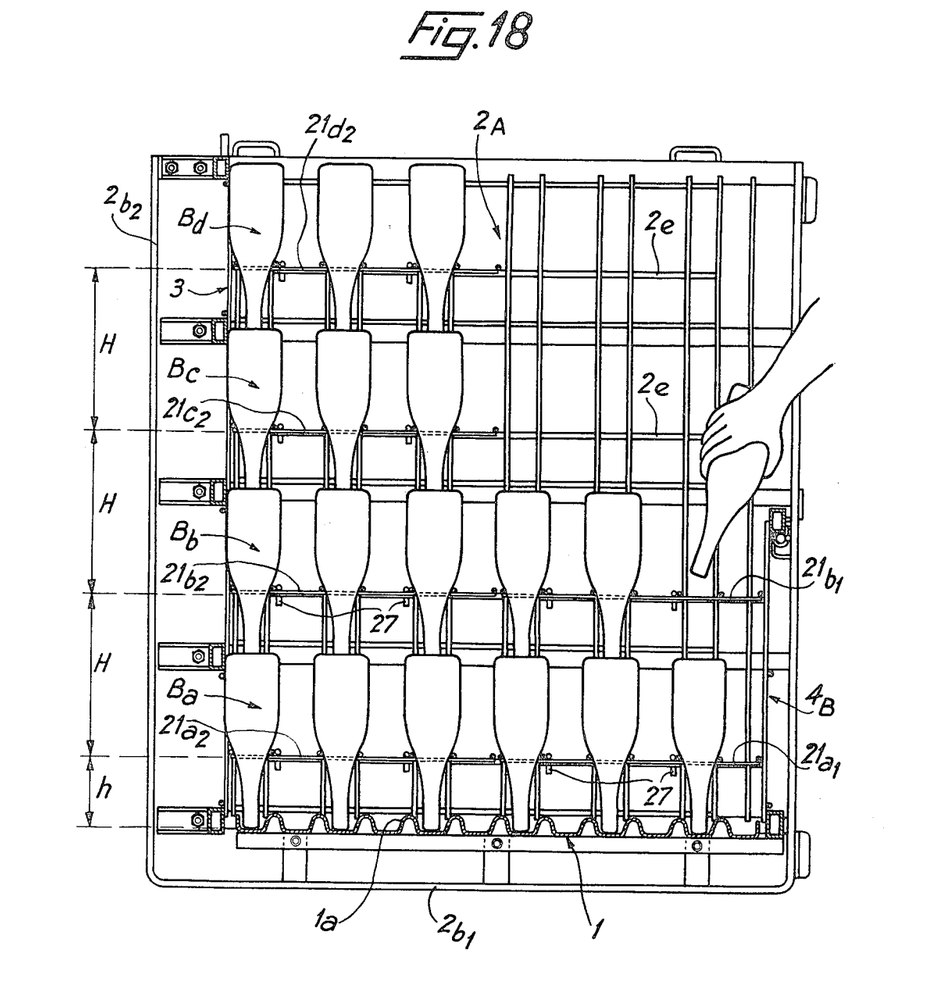
FIG. 18 is a side view of the rack according to FIG. 16 after removal of its lateral removable wall. It illustrates one of the phases of manual extraction of the bottles from the said rack.

In the case of the rack which has been taken as an example which is destined to contain four superposed layers of bottles (of which the two lower layers $B_a$ and $B_b$ only are visible in FIG. 18) the said rack is equipped interiorly according to the present invention with eight grille elements such as 21 (FIG. 17) which are fixed in removable fashion by their respective hooks 27 to the side walls 2A and 2B of the rack parallel to its base 1 at appropriate heights (designated by h and H on the left hand side of FIG. 3) above the said base 1 in order that each grill supports the necks of the bottles of a single layer such as $B_a$ or $B_b$ said bottles being placed vertically with their necks directed downwardly as shown in the lower part of FIG. 18. In the example under consideration the rack according to the present invention is accordingly equipped with four pairs of grille elements $21a1-21a2$, $21b1-21b2$, $21c1-21c2$ and $21d1-21d2$ (not shown in FIG. 16) which are grouped in pairs respectively in four horizontal planes separated from the base 1 of the rack as well as from one another respectively by vertical distances h and H determined as evident on FIG. 18; the height h is chosen in such a fashion that the bottles of the lower layer $B_a$ being placed vertically with their respective necks engaged in the juxtaposed openings of the grille element $21a1$ and $21a2$ the lower ends of the necks of the said bottles are engaged respectively between the grooves $1a$ of the base 1 of the rack and they come to rest on this base 1; the distance H is chosen in such a fashion that for example the bottles of the second layer B being placed vertically with their respective necks engaged in the juxtaposed openings of the grill elements $21b1$ $21b2$, their lower ends are located a little bit above the bases of the bottles of the lower layer B or if desired are engaged in the re-entrant parts of their respective bases.

When the rack according to the preceding description has been completely filled with the four layers of bottles and these are to be subjected to treatment according to the champagne method the said rack rests on the ground by its runners $21b1$, the different bottles B being placed vertically with their necks directed downwardly as visible in FIG. 18.

Discharging of the rack is then carried out in the following fashion: the upper face of the rack being disengaged, one first raises the upper element of its lateral wall 4A-4B which has the effect of laterally disengaging the rank of the upper layer of bottles nearest said lateral wall. There is however no risk of bottles dropping outside the rack as a result of the fact that each bottle is supported by the corresponding grille element 21. One can then proceed easily to remove the bottles which are supported by the upper grille element $21d1$ and which are nearest the open lateral face of the rack, then this grill element $21d1$ is removed by lifting it up in such fashion as to disengage its hooks 27 from the corresponding horizontal wires 2e of the lateral walls 2A and 2B of the said rack. This operation has the effect of disengaging the bases of the bottles of the immediately underlying layer which are supported by the grille element $21c1$. One then proceeds to remove this half-layer of bottles and the grille element $21c1$ in the fashion described above. After having removed the lower element 4B of the removable side wall of the rack the preceding operations are repeated for the half-layers of bottles supported respectively by the grille elements $21b1$ and $21a1$. There remain then in the rack only the superposed half-layers of bottles which are supported respectively by the grill elements $21a2$, $21b2$, $21c2$ and $21d2$, next side wall 3 of the rack. Their manual discharging takes place commencing by the upper half layer supported grille element $21d2$ which is then raised in order to enable the successive discharge of the three other lower half-layers.

The present invention is not limited to the embodiment which has been described above. It encompasses all its variants. The different grille elements 21 can be constructed in various ways and the same goes for their hooking elements for hooking over the side walls of the rack. For example each grille element can be formed by a perforated sheet. The lateral walls of the rack can be provided on their interior with hooks which are for cooperation with holes provided in the edges of the grille elements. The present invention is likewise applicable to racks the lateral walls of which are not like grilles but which are formed from plain metal sheet or perforated sheet. In place of being divided into two elements according to a plane parallel to the removable side wall of the rack, each grille such $21a1,21a2$ of the said rack can be divided into more than two elements along planes parallel to the said removable side wall. Each grille can also be constituted by a single element, notably in the case of a rack having a relatively small breadth in the direction perpendicular to its removable lateral wall. The present application is likewise applicable to racks of small height, destined for example to contain only one or two superposed layers of bottles and which does not comprise as a result a removable lateral wall but four fixed lateral walls.

We claim:

1. Apparatus permitting wine to be treated in bottles according to the champagne method comprising a rack in the form of a rectangular parallelepiped open on one face which is opposite to a base and provided with support elements for the corks of a layer of bottles which completely fill the rack, in some case with several other layers of bottles superposed and supported one on the other, said rack comprising two series of feet or runners placed along perpendicular walls of the rack and permitting the rack to be placed in a first position where the bottles are horizontal and a second position perpendicular to the first where the bottles are vertical with their necks directed downwardly, and being characterized in that lateral walls of the rack perpendicular to its base are provided towards the interior of the rack with rails disposed perpendicularly to the base of the rack to guide bottles in horizontal position introduced into the rack through an open face thereof and to assure the proper positioning of the bottles placed against said lateral walls, wherein one of said lateral walls is mounted in removable fashion, to enable at least a part of that wall to be moved in order to facilitate the extraction of the bottles in the vertical position, and wherein the removable wall of the rack comprises two separately removable parts which meet in a horizontal plane substantially halfway up the removable wall.

2. The apparatus of claim 1 wherein the lower edge of each part of the removable wall comprises pins which can be engaged in one case in corresponding holes on the edge of the base of the rack and in the other in the upper edge of the immediately lower part of the said removable wall, and wherein the upper edge of each part of the removable wall is provided at its ends with hook latches affixed in such a fashion as to cooperate with the edges of corresponding openings in the two adjacent lateral walls of the rack.

3. The apparatus of claim 2 and including a locking bar which can be manually freed associated with each latch in order to fix it in a position where the hook of the latch cooperates with the edge of the corresponding opening in the neighbouring lateral wall.

4. The apparatus of claim 3 wherein each hook latch has at its hook end a lateral projection, angularly spaced from the corresponding hook, which projection in the locking position cooperates with an edge of the corresponding opening of the neighbouring lateral wall to stop all movement of the removable wall towards the exterior of the rack, while, at an angular position of the hook of the latch intermediate between its positions of locking and unlocking, said lateral projection is moved out of the way to permit a small movement of the removable wall towards the exterior of the rack permitting the loosening and discharging of the bottles contained in the rack, this small movement of the removable wall being limited by the cooperation of part of said latch with said edge of the opening of the neighbouring wall.

* * * * *